(No Model.) 2 Sheets—Sheet 1.

H. J. DEMUTH, E. N. PERKINS & J. T. DADE.
APPARATUS FOR MANUFACTURING SALT.

No. 575,338. Patented Jan. 19, 1897.

Witnesses:
F. G. Fischer

Inventors
H. J. Demuth, J. T. Dade and
E. N. Perkins
By Higdon & Higdon
Attys.

(No Model.) 2 Sheets—Sheet 2.
H. J. DEMUTH, E. N. PERKINS & J. T. DADE.
APPARATUS FOR MANUFACTURING SALT.

No. 575,338. Patented Jan. 19, 1897.

Witnesses:
F. G. Fischer
[signature]

Inventors
H. J. Demuth, J. T. Dade and
E. N. Perkins.
By
Higdon & Higdon
Attys.

UNITED STATES PATENT OFFICE.

HERMAN J. DEMUTH, EDWARD N. PERKINS, AND JOSEPH T. DADE, OF HUTCHINSON, KANSAS.

APPARATUS FOR MANUFACTURING SALT.

SPECIFICATION forming part of Letters Patent No. 575,338, dated January 19, 1897.

Application filed July 18, 1896. Serial No. 599,759. (No model.)

*To all whom it may concern:*

Be it known that we, HERMAN J. DEMUTH, EDWARD N. PERKINS, and JOSEPH T. DADE, of Hutchinson, Reno county, Kansas, have invented certain new and useful Improvements in Evaporating Apparatus for the Manufacture of Salt, of which the following is a full, clear, and exact description, reference being had to the accompanying drawings, forming a part thereof.

Our invention relates to evaporating apparatus, and more particularly is designed for use in the manufacture of salt; and the object of the invention is to produce an apparatus of this character wherein the brine is circulated effectively and the consumption of fuel is reduced to the minimum.

With these general objects in view the invention consists in certain novel and peculiar features of construction and combinations of parts, as will be hereinafter described and claimed.

In order that the invention may be fully understood, we will proceed to describe it with reference to the said accompanying drawings, in which—

Figure 1:
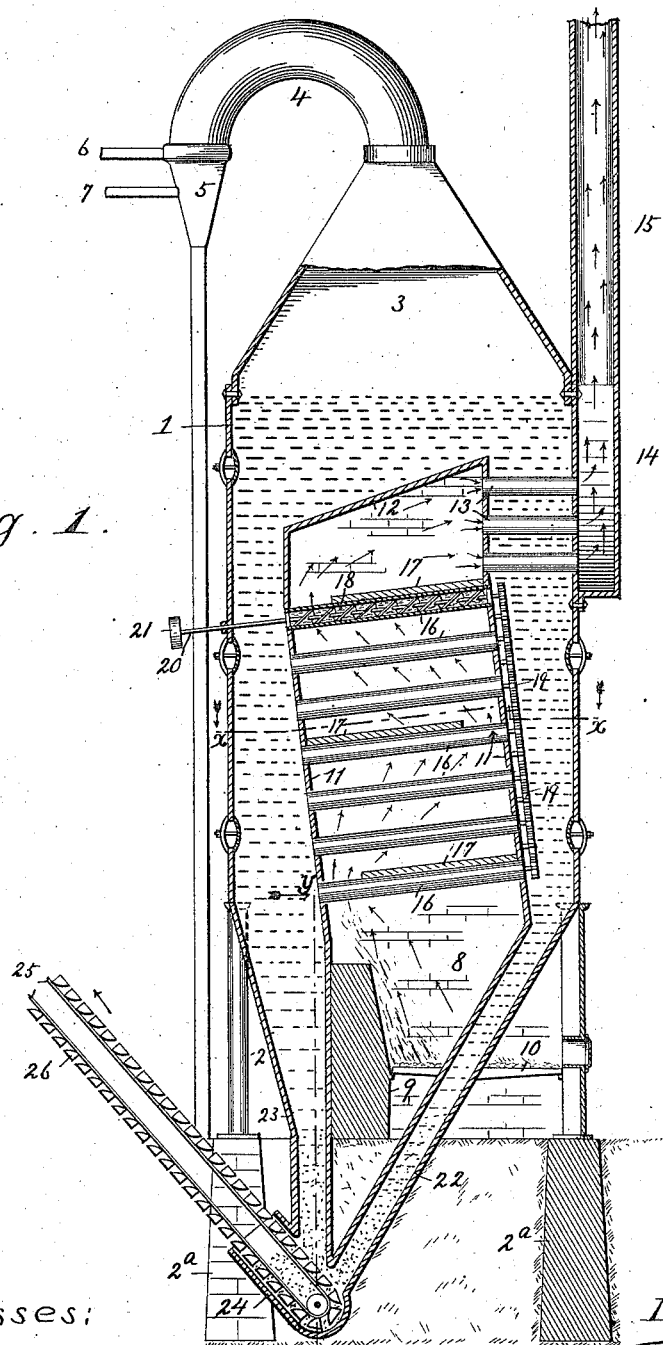
Figure 2:
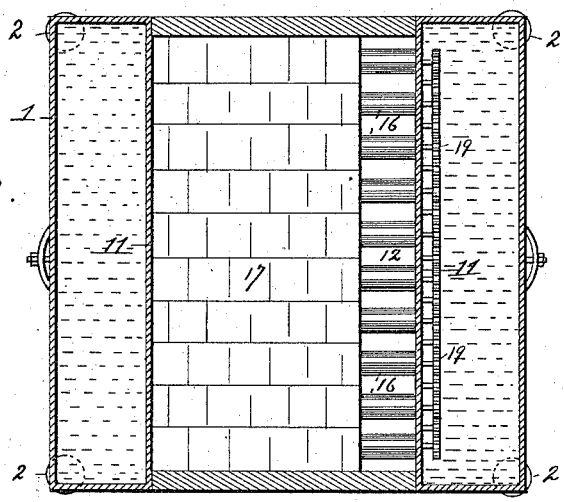
Figure 3:
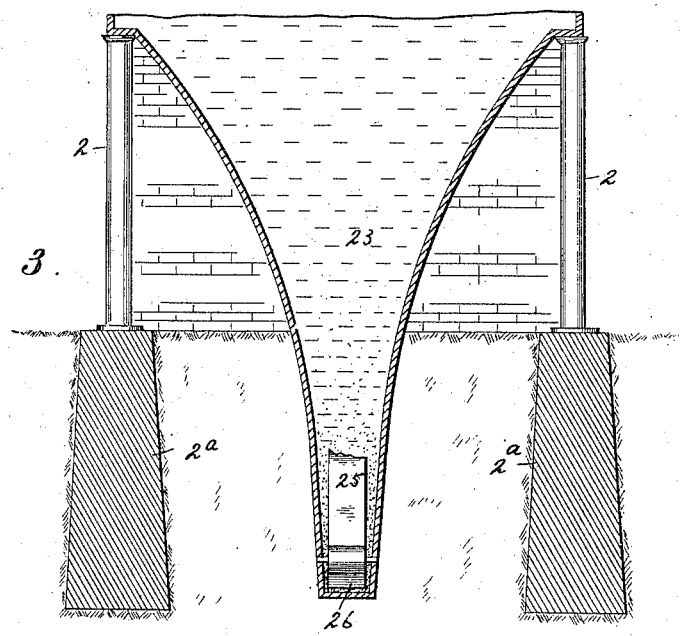

Figure 1 represents a view, partly in vertical section, of an evaporating apparatus embodying our invention. Fig. 2 represents a cross-section of the same, taken on the line x x of Fig. 1. Fig. 3 represents a section taken on the line y y of Fig. 1.

Referring to the drawings in detail, 1 designates a brine magazine or receptacle, which is preferably of rectangular form in cross-section and is mounted upon standards 2, which rest upon a suitable foundation structure 2ª of stone or brick work. At its upper end it is formed with a cone or concentrating-chamber 3, and is connected by the semicircular pipe 4 with the condenser 5 for the vapor which passes up from the cone or condensing-chamber.

6 designates the water-pipe, which communicates with said condenser 5 and represents the height of the water-line therein where the vapor is condensed, and 7 designates a pipe which is connected to a vacuum-pump (not shown) for creating a partial vacuum and thereby aiding in the evaporating process.

Within the lower end of the magazine or receptacle a furnace is built, consisting of the side walls 8, the back wall 9, and the grate 10, on which the fuel is placed. Said furnace communicates with a superposed chamber 12, arranged about centrally within the magazine or receptacle, and said chamber near its upper end is connected by a series of flues 13 with the chamber 14, to which is connected the stack 15, through which the products of combustion escape.

Below the flues 13 and above the grate a series of inclined tubes 16 extend from the front to the rear through the chamber 12, through which the brine circulates, as hereinbefore explained, and arranged within said chamber are a series of alternately-arranged baffle-plates 17, so as to cause the products of combustion to follow a tortuous course in passing up through said chamber 12, and consequently to utilize to the fullest extent the heating power obtained from the fuel. By thus retarding the passage of the products of combustion the full power of the heat generated is obtained in heating the tubes 16, and also the brine in the magazine, which is consequently caused to circulate positively and reliably upward through said tubes. This utilization of all the heat of course results in a corresponding saving in the consumption of fuel. In order, however, to make this circulation more rapid and more positive and reliable, we arrange in each of said tubes a spiral conveyer 18 and mount upon the corresponding ends of their shafts or stems the intermeshing cog-wheels 19. The shaft 20 of one of said conveyers is extended rearwardly through the back wall of the magazine and carries a belt-wheel or pulley 21, which is driven at a suitable speed by means of a belt, (not shown,) or said conveyer may be rotated by other gearing.

The magazine or receptacle terminates at its lower end in two depending and downwardly-tapering legs 22 and 23, respectively, and said legs at their lower ends communicate with each other and with the foot 24 and an endless elevator 25. Said elevator is provided with the customary series of buckets 26, which gather up the salt which settles down through said legs and convey it, as indicated in the arrow, Fig. 1, to the point of discharge.

In practice the heat from the fire causes a constant and continuous circulation of brine within the magazine, and consequently causes the rapid precipitation of salt through said legs to said carrier and the vaporization of the water. The latter, as hereinbefore indicated, passes up from the concentrating-chamber through the pipes 4 and is condensed in the condenser 5. The spiral conveyers also, by their continuous rotation, prevent the accumulation of scales on the inner walls of the tubes, as will be readily understood.

From the above description it is apparent that we have produced an evaporating apparatus to be used in the manufacture of salt which is positive and reliable in operating and which is comparatively inexpensive of construction and operation.

Having thus described the invention, what we claim as new, and desire to secure by Letters Patent, is—

1. An evaporating apparatus, comprising a suitable magazine terminating at its lower end in downwardly-depending legs, and provided with an internal chamber and an external chamber, flues connecting the upper end of the internal chamber with said external chamber, a furnace communicating with the lower end of the internal chamber, brine-conducting pipes extending through said internal chamber and interposed between said furnace and said flues, and devices to force the brine to circulate through said tubes, substantially as described.

2. An evaporating apparatus, comprising a suitable magazine terminating at its lower end in downwardly-depending legs, and provided with an internal chamber and an external chamber, flues connecting the upper end of the internal chamber with said external chamber, a furnace communicating with the lower end of the internal chamber, brine-conducting pipes extending through said internal chamber and interposed between said furnace and said flues, and alternately-arranged baffle-plates within said internal chamber so as to cause the products of combustion in the furnace to follow a tortuous course, substantially as described.

3. An evaporating apparatus, comprising a suitable magazine terminating at its lower end in downwardly-depending legs, and provided with an internal chamber and an external chamber, flues connecting the upper end of the internal chamber with said external chamber, a furnace communicating with the lower end of the internal chamber, brine-conducting pipes extending through said internal chamber and interposed between said furnace and the flues, alternately-arranged baffle-plates within said internal chamber so as to cause the products of combustion in the furnace to follow a tortuous course, and an endless elevator communicating with the lower end of the depending legs of the magazine or receptacle to carry off the salt, substantially as described.

4. An evaporating apparatus, comprising a suitable magazine, terminating at its lower end in depending legs, and provided with an internal chamber and an external chamber, flues connecting the upper end of the internal chamber with said external chamber, a furnace communicating with the lower end of the internal chamber, brine-conducting pipes extending through said internal chamber and interposed between said furnace and said flues, and rotating spiral conveyers arranged within said brine-conducting pipes, to force the brine to circulate through said tubes, substantially as shown and described.

In testimony whereof we affix our signatures in presence of two witnesses.

HERMAN J. DEMUTH.
EDWARD N. PERKINS.
JOSEPH T. DADE.

Witnesses:
 LEWIS A. DICE,
 CHARLES F. CRAWFORD.